US008882432B2

(12) United States Patent
Bastian, II et al.

(10) Patent No.: US 8,882,432 B2
(45) Date of Patent: Nov. 11, 2014

(54) ROBOTIC AUTOMATED STORAGE AND RETRIEVAL SYSTEM MIXED PALLET BUILD SYSTEM

(71) Applicant: Bastian Solutions, LLC, Indianapolis, IN (US)

(72) Inventors: William A. Bastian, II, Carmel, IN (US); Britt Calloway, Westfield, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 70 days.

(21) Appl. No.: 13/785,035

(22) Filed: Mar. 5, 2013

(65) Prior Publication Data

US 2013/0184854 A1    Jul. 18, 2013

Related U.S. Application Data

(62) Division of application No. 12/730,348, filed on Mar. 24, 2010, now Pat. No. 8,403,614.

(51) Int. Cl.
*B65G 1/00* (2006.01)
*B65G 65/00* (2006.01)
*B65G 61/00* (2006.01)
*B65G 1/137* (2006.01)

(52) U.S. Cl.
CPC .............. *B65G 1/1375* (2013.01); *B65G 61/00* (2013.01)
USPC ................ 414/282; 414/799; 53/556; 53/587

(58) Field of Classification Search
USPC ................... 414/791.6, 792.7, 793, 799, 282; 53/540, 556, 587
See application file for complete search history.

(56) References Cited

U.S. PATENT DOCUMENTS

| 4,159,696 A | 7/1979 | Martin |
| 4,212,385 A | 7/1980 | Leach |

(Continued)

FOREIGN PATENT DOCUMENTS

| JP | H06-115632 A | 4/1994 |
| JP | H08-113314 A | 5/1996 |

(Continued)

OTHER PUBLICATIONS

International Patent Application No. PCT/US2011/026570 International Search Report and Written Opinion mailed Nov. 7, 2011.

(Continued)

*Primary Examiner* — Stephen Vu
(74) *Attorney, Agent, or Firm* — Woodard, Emhardt, Moriaty, McNett & Henry LLP

(57) ABSTRACT

A robotic automated storage and retrieval system (AS/RS) mixed pallet build system includes a rack that includes two or more verticals levels upon which items are stored. The system includes a three-dimensional robotic AS/RS that includes a carriage, robot arm, vertical lift, and horizontal propulsion system. The items from the rack are loaded upon the carriage to create a pallet. The robot arm is configured to stack the items from the racks onto the pallet. The vertical lift is configured to move the carriage vertically between the vertical levels of the racks. The horizontal propulsion system is configured to move the carriage horizontally along the rack so that the carriage is able to service the entire length of the rack. The three-dimensional robotic AS/RS also includes a stretch wrapper that progressively secures the layers of items on the pallet to prevent the items from falling off the pallet.

12 Claims, 13 Drawing Sheets

(56) References Cited

U.S. PATENT DOCUMENTS

| | | |
|---|---|---|
| 4,236,862 A | 12/1980 | McCormick |
| 4,641,271 A | 2/1987 | Konishi et al. |
| 5,178,506 A | 1/1993 | Meschi |
| 5,203,671 A | 4/1993 | Cawley et al. |
| 5,226,782 A | 7/1993 | Rigling |
| 5,336,042 A | 8/1994 | Winski |
| 5,348,440 A | 9/1994 | Focke |
| 5,386,677 A | 2/1995 | Kobuki et al. |
| 5,733,098 A | 3/1998 | Lyon et al. |
| 5,826,699 A | 10/1998 | Trauten |
| 5,863,172 A | 1/1999 | Pearson et al. |
| 5,955,857 A | 9/1999 | Kwon et al. |
| 6,061,607 A | 5/2000 | Bradley et al. |
| 6,377,867 B1 | 4/2002 | Bradley et al. |
| 6,533,533 B1 | 3/2003 | Heston |
| 6,824,345 B2 | 11/2004 | Hansl et al. |
| 6,865,862 B2 | 3/2005 | Daoust et al. |
| 7,266,422 B1 | 9/2007 | DeMotte et al. |
| 7,381,022 B1 | 6/2008 | King |
| 2008/0046116 A1 | 2/2008 | Khan et al. |
| 2008/0181753 A1 | 7/2008 | Bastian et al. |

FOREIGN PATENT DOCUMENTS

| | | |
|---|---|---|
| KR | 10-0666966 B1 | 1/2007 |
| WO | WO 2008/091733 A2 | 7/2008 |
| WO | WO 2009/089159 A2 | 7/2009 |

OTHER PUBLICATIONS

Power Automation Systems—High Speed Layer Picking & Building [retrieved Mar. 24, 2010]. Retrieved from the Internet: <URL: http://www.pas-us/com/video%20whitepaper/powerbuild/index.htm>.

Power Automation Systems—PASNews [retrieved Sep. 2, 2009]. Retrieved from the Internet: <URL: http://www.pas-us.com/news.html>.

Power Automation Systems—PowerBuild Case Study, Leche Pascual Group, May 2009.

Power Automation Systems—PowerBuild High Speed Mixed-Palletizing [retrieved Sep. 2, 2009]. Retrieved from the Internet: <URL: http://www.pas-us.com/powerBuild.html>.

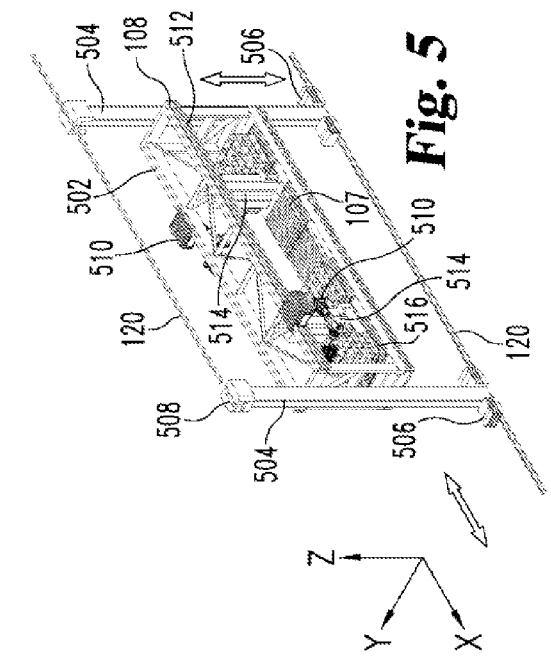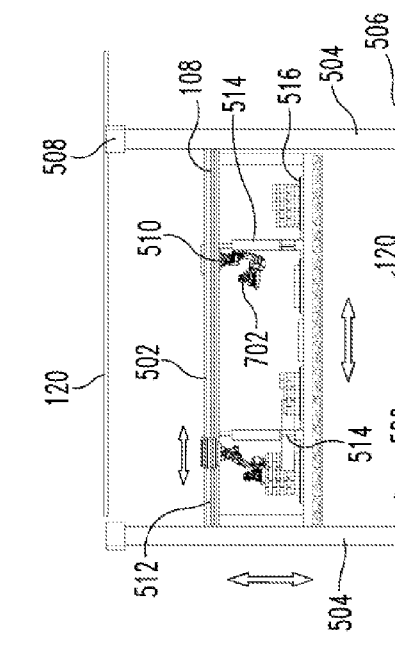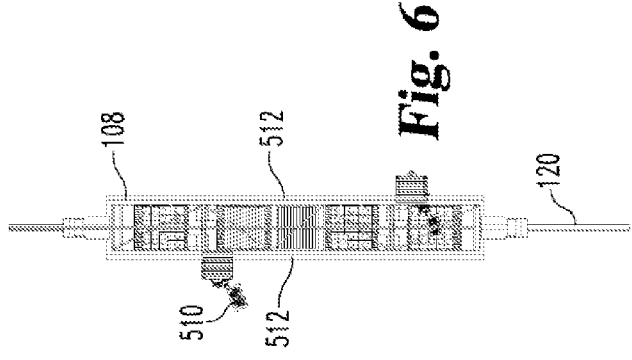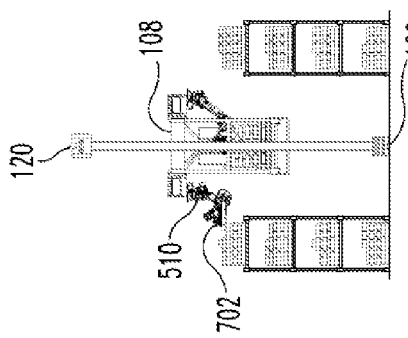

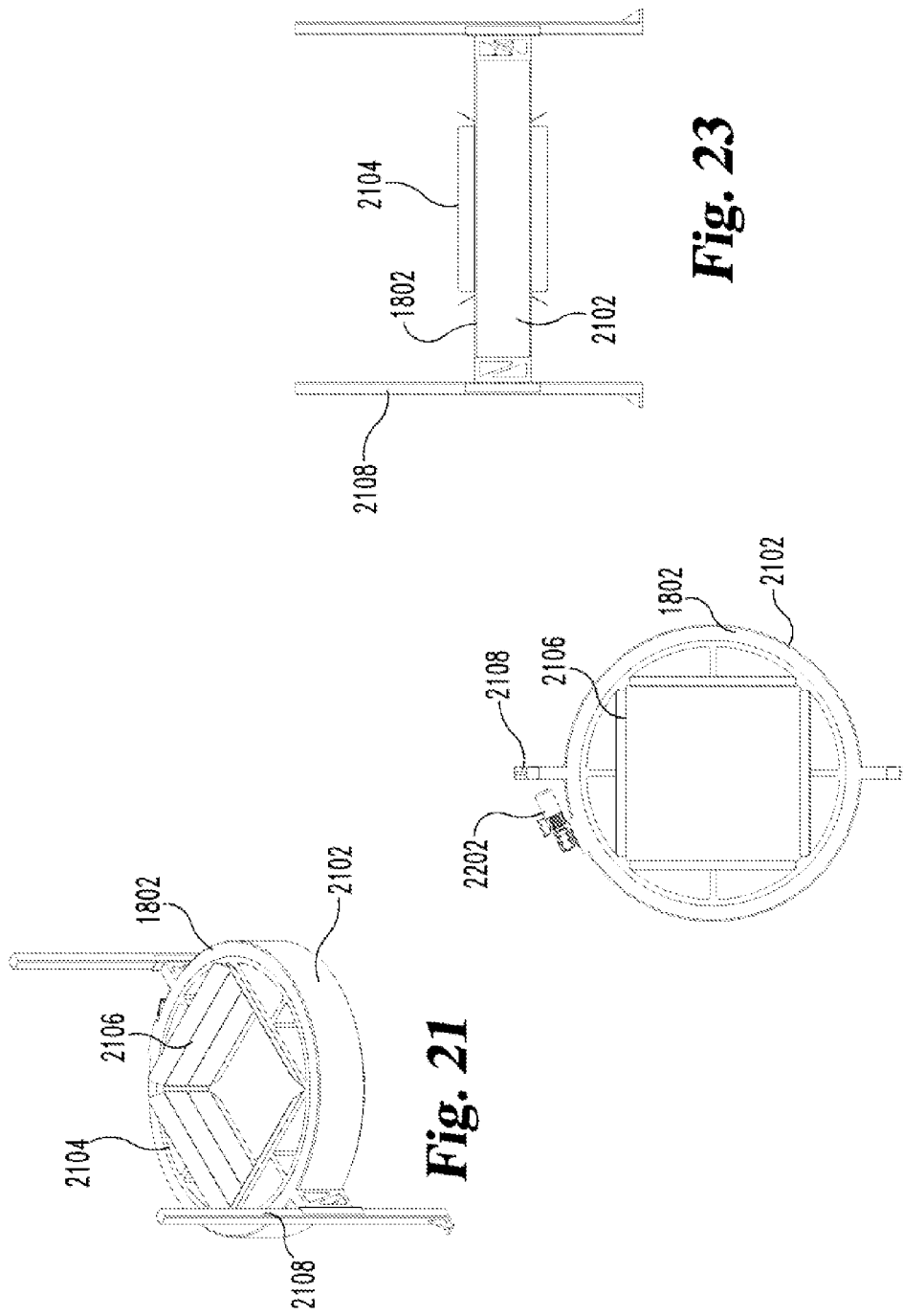

ROBOTIC AUTOMATED STORAGE AND RETRIEVAL SYSTEM MIXED PALLET BUILD SYSTEM

CROSS-REFERENCE TO RELATED APPLICATION

This application is a divisional of U.S. patent application Ser. No. 12/730,348, filed Mar. 24, 2010, which is hereby incorporated by reference.

BACKGROUND

For both retail and commercial environments, there has always been a need to create what are termed "mixed pallets" in which different cases are stored and/or shipped on a single pallet to various retail, wholesale, and/or manufacturing locations. For example, common areas in which there is a need for mixed pallets are grocery stores, convenience stores, and industrial settings. A convenience store, for instance, may not need a complete pallet of a particular brand of soft drinks. A combination of various soft drink brands or other items can be combined together on a single pallet for shipment to the store, thereby reducing shipping costs. Creating these mixed pallet loads can be quite a labor-intensive proposal, which in turn can increase employee turnover. Picking errors can be quite common when building mixed pallet loads. Moreover, storage space is typically at a premium and can be quite costly, and these mixed pallet requirements significantly strain storage requirements because of the large number of Stock Keeping Units (SKUs) involved. Orders typically need to be processed and shipped in a rather short time cycle, and the creation of mixed pallets can significantly slow down the order fulfillment process.

Thus, there is a need for improvement in this field.

SUMMARY

Some of the inventors were involved in the development of previous systems described in US Published Application No. 2008/0181753 A1, published Jul. 31, 2008, and International Published Application No. WO 2009/089159 A1, published Jul. 16, 2009, which are hereby incorporated by reference in their entirety. While the three-dimensional storage systems described in these published applications provide a number of unique benefits, it was discovered that some of the features needed improvement for mixed pallet build processes. For example, it was discovered that as the number of different types of SKUs increased, the vertical transport platform on which the items were placed became very heavy to the point that it significantly slowed throughput. The length of the robotic Automatic Storage and Retrieval System (AS/RS) or lift platform on which items were loaded dramatically increased with the number of rack bays that needed to be serviced for a wide variety of items. This lengthening of the platform increased its weight to a point where very long aisle systems became impractical. This problem of the inability to practically service a large number of items in a vertical storage rack system has been solved by not only allowing the robotic AS/RS platform to move vertically but also horizontally within the rack aisle. This ability to move horizontally along the rack aisle allows the robotic AS/RS platform to be considerably shorter than the length of the rack, which in turn helps reduce the overall weight of the lifting platform as well as improve its speed. This also allows the system to be scaled up or down to fit a particular application. In addition, this horizontal movement ability reduces the number and length of precision components, such as the gantry rail, as well as the length of the electrical cable and cable track that provides power to the robot arms. In one particular design example, the robotic AS/RS moves vertically and horizontally between a pair of guide rails that incorporate a lifting mechanism for moving the robotic AS/RS platform on which the mixed pallets are built both vertically as well as horizontally.

One of the features of the system is that you go directly from a "pick" pallet to a "build" pallet without having to break down, buffer, or sequence individual cases. This allows the robotic AS/RS mixed pallet build system to have a significantly smaller floor footprint and is much more cost competitive.

With the robotic AS/RS moving both vertically and horizontally, the items on the pallet may have a tendency to dislodge and fall off the pallet. To address this issue, the three-dimensional robotic AS/RS described herein incorporates a mechanism that progressively secures the case layers vertically while the cases are loaded onto the build pallet. In one particular form, a stretch wrapper progressively wraps the various layers as cases are packed onto the pallet. In one variation, the stretch wrapper is located on the three-dimensional robotic AS/RS carriage, and in another variation, the robot arms integrate the stretch wrapper functionality. Securing the cases at the various pallet tier levels as the pallet is built progressively facilitates quicker AS/RS carriage movement and palletizing speeds for the three-dimensional robotic AS/RS. In still yet another variation, the three-dimensional robotic AS/RS incorporates turntables to rotate the pallets and facilitate stretch wrapping. These turntables can also help speed the pallet building of various items by orienting the various sides of the pallet at a position where one or more robot arms can more easily load items onto the pallet. In other words, the turntable allows reorientation of the pallet so that the pallet is oriented at the optimal position for palletizing with the robot.

Some SKUs have an irregular shape and therefore have a tendency to easily fall off the pallet. In one particular technique, the robot holds the irregularly shaped item in place as the robot stretch wraps the item to the items stacked on the pallet. In still yet another example, the robot arm includes a vision system for compensating for the variable rotational orientation of the pallet due to the rotation of the turntable. In still yet another example, a hard stop is used to accurately position the turntable. With another technique, to help improve pallet build stability, a complete layer of one SKU is loaded on a starter pallet before the starter pallet is loaded onto the three-dimensional robotic AS/RS. To further prevent items from falling off the pallet stack, the system incorporates a unique stacking technique to build a mixed pallet in which the characteristics of the item to be loaded are first identified through a vision system. The heavier and stronger items or their cases are loaded at the bottom of the pallet, like items with the same height are loaded in the same layer, and irregular items with different heights are then loaded on the top layer. In one example, the higher moving SKUs can be located at the first few carriage positions. Occasionally, heavy, slow moving items need to be picked after more fragile SKUs located in the higher moving positions. When this occurs, the robot arms can queue the fragile items on the platform. In other variations, difficult build items can be queued on the platform until they can be manually stacked at the end of the line. In another example, slow moving SKUs can be located at the end of the horizontal movement of the robotic AS/RS in a cascading case flow manner. In addition, the robot arm can integrate a vision system to validate that the particular item is placed properly.

A robot End-Of-Arm Tool (EOAT) can be interchangeable such that the vacuum/gripper head used to lift various items such as cartons can be replaced with a shrink wrap roll applicator. This interchangeable nature allows greater flexibility for the robot arm. In another example, the robot EOAT can incorporate a pallet gripper that helps to quickly load empty pallets onto the three-dimensional AS/RS carriage. The system can also include a manual override that allows an operator to manually operate the robot such as in the case of correcting an item that has tipped over or fallen out of position. The manual override can also include a vision-assisted haptic interface that provides feedback to the supervisor with respect to the robot arm so as to provide greater control. The haptic system can be remotely operated at a work station on the ground floor.

The AS/RS carriage system can further incorporate energy saving systems such as regenerative electrical braking to recover most of the energy lost when the three-dimensional AS/RS carriage is lowered or otherwise slowed down.

The vacuum gripper in the EOAT includes a high resolution of vacuum cup cells against which the case is placed. Each vacuum cup can incorporate an individual valve that controls the application of the vacuum to the particular vacuum cup. This in turn allows greater resolution such that beverage bottles or other items of varying sizes can be readily gripped.

The above-described three-dimensional AS/RS carriage can be used for both unloading (picking) items from the various rack levels to create various mixed pallets or loading items back (replenishing) onto the rack pallets. The racks themselves can include a single pallet of items or multi-deep rows of pallets.

To reduce weight as well as provide a compact design, the vertical lift AS/RS systems used to move the AS/RS carriage can incorporate linear servo motors. In one example, the masts on which the carriage rides include linear servo motors. Likewise, the propulsion system used to move the carriage horizontally in one example includes linear servo motors.

To provide smoother and quieter operation of the AS/RS crane, alternate suspension of the AS/RS crane can be used. Alternates to steel wheels rolling over steel rails can include active magnetic levitation bearings and air bearings on a flat surface.

These are but a few features of the system, and it should be appreciated that other unique features will be described below.

BRIEF DESCRIPTION OF THE DRAWINGS

FIG. 5 is a perspective view of the three-dimensional robotic AS/RS used in the FIG. 1 mixed pallet build system.

FIG. 6 is a top view of the robotic AS/RS shown in FIG. 5.

FIG. 7 is an end view of the robotic AS/RS shown in FIG. 5.

FIG. 8 is a side view of the robotic AS/RS shown in FIG. 5.

FIG. 21 is a perspective view of the build pallet ring shown in FIG. 18.

FIG. 22 is a top view of the FIG. 21 build pallet ring.

FIG. 23 is a side view of the FIG. 21 build pallet ring.

DESCRIPTION OF THE SELECTED EMBODIMENTS

Figure 1:
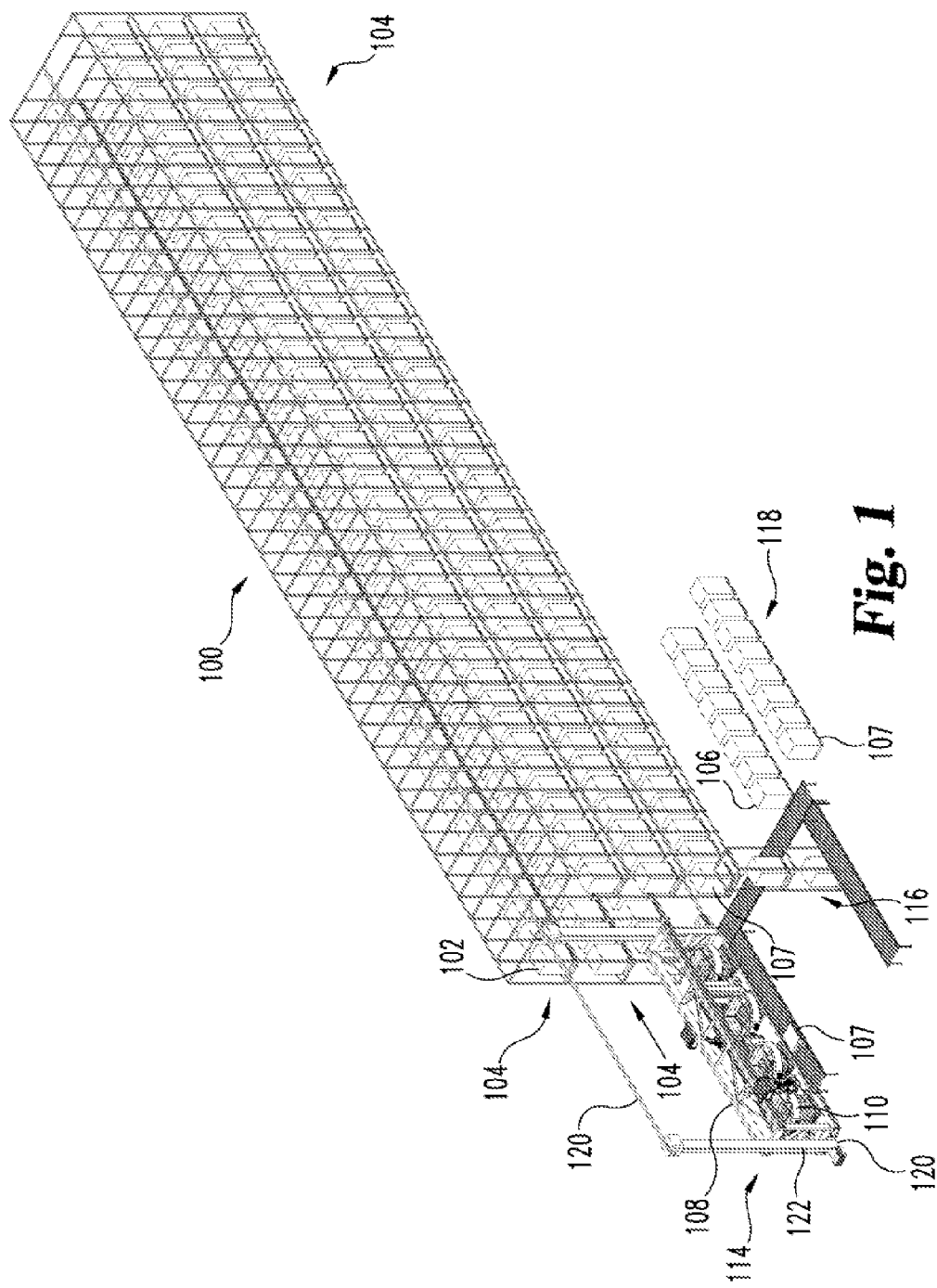
FIG. 1 is a perspective view of one example of a mixed pallet build system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

For the convenience of the reader, it should be noted that the drawings in which an element is first introduced is typically indicated by the left-most digit(s) in the corresponding reference number. For example, a component identified with a 100 series reference number (e.g., 100, 101, 102, etc.) will usually first be discussed with reference to FIG. 1, and a component with a 200 series reference number (e.g., 200, 201, 202, etc.) will usually first be discussed with reference to FIG. 2 and so on.

Figure 2:
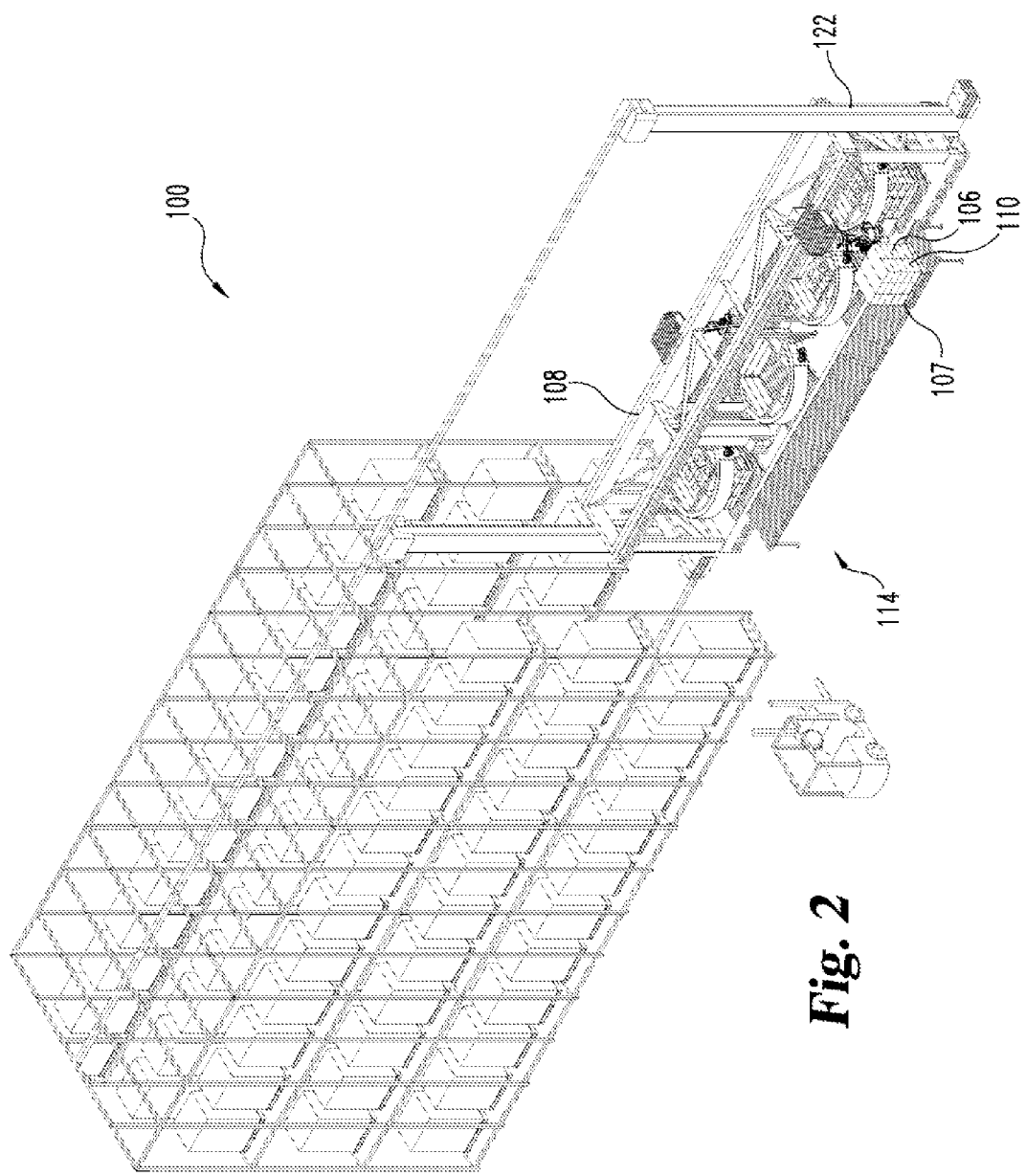
FIG. 2 is an enlarged perspective view of the FIG. 1 mixed pallet build system at the loading/unloading area.
Figure 3:
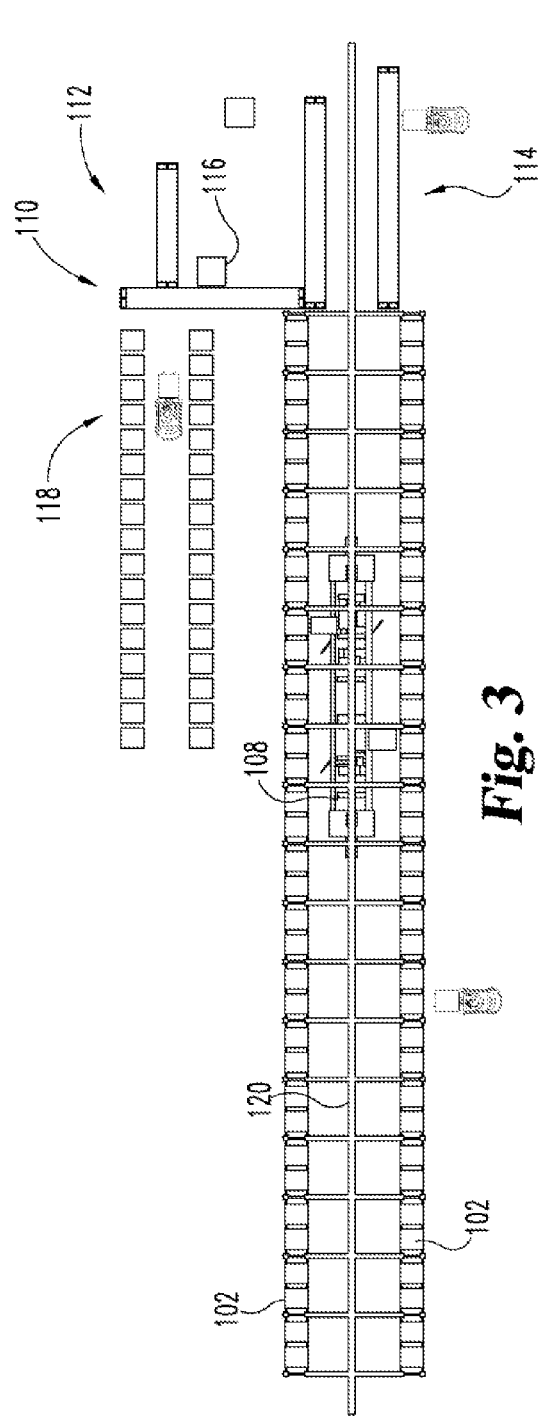
FIG. 3 is a top plan view of the FIG. 1 mixed pallet build system.

A mixed pallet build system 100 will be described initially with reference to FIGS. 1, 2, 3, and 4. FIG. 1 shows a perspective view of the mixed pallet build system 100. FIG. 2 shows an enlarged perspective view of the mixed pallet build system 100 where the mixed pallets are unloaded from the system 100. FIG. 3 is a top view of the mixed pallet build system 100, and FIG. 4 is a side view of the mixed pallet build system 100.

Turning to FIG. 1, the mixed pallet build system 100 includes a series of pallet racks 102 with multiple vertical levels 104 on which items 106 are stored on pallets 107. Usually, the pallets 107 in the racks 102 individually contain the same items 106, but sometimes individual pallets 107 can be different types of items or mixed. The mixed pallet build system 100 further includes a three-dimensional robotic AS/RS carriage 108 that is able to move both vertically and horizontally between the racks 102 in order to create mixed pallets 110 that contain a variety of items 106. In the illustrated embodiment, the items 106 are in the form of cartons, boxes, bottles, or bags in which various one or more items can be palletized, but as will be explained in greater detail below, other types of items 106, besides cartons and boxes, can be loaded on the pallets 110. The mixed pallet build system 100 includes a starter pallet loading area 112 in which empty or partially loaded pallets 107 are loaded onto the three-dimensional robotic AS/RS carriage 108. As can best be seen in FIG. 2, an unloading area 114 of the built mixed pallets is where the finished mixed pallets 110 are unloaded from the mixed pallet build system 100. In the depicted embodiment, a forklift is used to unload the finished mixed pallets 110 from the unloading area 114, but it should be appreciated that the mixed pallets 110 can be unloaded in other ways. For instance, the pallets can be loaded and/or unloaded continuously through a series of conveyors, Automated Guided Vehicles (AGVs), or transfer shuttles.

Returning to FIG. 1, the mixed pallet build system 100 further incorporates an empty pallet dispenser 116 along with a full layer pick area 118 in which full layers of items 106 are placed onto the starter pallets 107 before loading onto the three-dimensional robotic AS/RS carriage 108. The starter layer of items 106 on the pallet 107 provides a stable initial base upon which other items 106 can be stacked on the three-dimensional robotic AS/RS carriage 108. In other operational modes, empty pallets 107 are loaded onto the three-dimensional robotic AS/RS carriage 108. Of course, in other variations, a combination of empty pallets 107 and ones with a starter layer of items 106 can be loaded onto the three-dimensional robotic AS/RS carriage 108.

Figure 4:
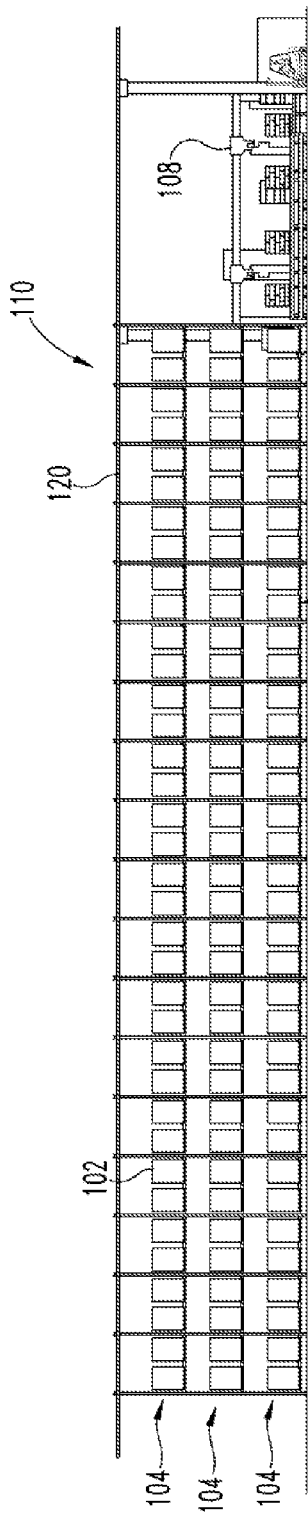
FIG. 4 is a side view of the FIG. 1 mixed pallet build system.

As can be seen in FIGS. 1, 3, and 4, the three-dimensional robotic AS/RS carriage 108 carriage 108 is able to move horizontally along rails 120 that are located vertically above and below the three-dimensional robotic AS/RS carriage 108 carriage 108. Looking at FIG. 3, this horizontal movement allows the three-dimensional robotic AS/RS carriage 108 to service bays of racks 102 that are considerably longer than the length of the three-dimensional robotic AS/RS carriage 108. This in turn helps to minimize the overall weight of the three-dimensional robotic AS/RS carriage 108 while at the same time allows the three-dimensional robotic AS/RS carriage 108 to create mixed pallets 100 with a wide variety of items 106 from all rack locations. A vertical lift mechanism 122 moves the robotic AS/RS carriage 108 vertically.

FIGS. 5, 6, 7, and 8 further illustrate the features of the three-dimensional robotic AS/RS carriage 108. FIG. 5 shows a perspective view of the three-dimensional robotic AS/RS carriage 108, while FIGS. 6 and 7 respectively illustrate the top and end views of the three-dimensional robotic AS/RS carriage 108. FIG. 8 illustrates a side view of the three-dimensional robotic AS/RS carriage 108. Turning to FIG. 5, the three-dimensional robotic AS/RS carriage 108 includes a carriage 502 upon which the build pallets 107 rest, a pair of crane masts 504 upon which the carriage 502 moves vertically via the vertical lift mechanism 122, a horizontal propulsion system 506 that moves the three-dimensional robotic AS/RS carriage 108 along the rails 120, and guides 508 that guide it along the rails 120. To reduce the overall weight, the crane masts 504 in one variation are made from a composite material or aluminum. Looking at FIGS. 1 and 5, the vertical lift mechanism 122 is integrated into crane masts 504 at opposite ends of the carriage 502. In one example, the vertical lift mechanism 122 includes a linear servo motor incorporated into the crane masts 504. In other examples, the vertical lift mechanism can include cable reel servo motor, hydraulic, pneumatic, and/or mechanical counterweight type lift systems, to name just a few examples. In another example, the horizontal propulsion system 506, which is used to move the carriage 502 horizontally, includes one or more linear servo motors incorporated into the rails 120. The propulsion system 506 in other variations can include electric motors, pneumatic motors, hydraulic motors, magnetic levitation propulsion, and the like. In other variations, the masts 504 ride along the rails 120 on active magnetic bearings and/or air bearings. The magnetic and air bearings allow the carriage 502 to move smoother and quicker, with faster acceleration and deceleration in comparison to traditional steel wheels. Moreover, the magnetic and air bearings allow the carriage 502 to move smoothly along the rails 120, thereby reducing the risk of items 106 moving within or falling off the pallets 107.

The three-dimensional robotic AS/RS carriage 108 further includes robot arms 510 that are moveable along gantry rails 512 that are secured to opposing sides of the carriage 502. As indicated by the double arrow in FIG. 8, the robot arms 510 are able to move horizontally along the gantry rails 512 so that the robot arms 510 can service multiple pallets 107 on the carriage 502. In the depicted embodiment, the three-dimensional robotic AS/RS carriage 108 has robot arms 510 disposed on opposing sides of the carriage 502. This helps prevent the robot arms 510 from interfering with the operation of one another. In other variations, the robot arms 510 can be configured differently. For instance, the carriage 502 can include more or less robot arms 510 than is shown, and the robot arms 510 can be located anywhere on the AS/RS carriage.

On the AS/RS carriage 502, three-dimensional robotic AS/RS carriage 108 has four stretch wrappers 514 that are used to progressively vertically stretch wrap the various layers of items 106 on the pallets 107 as the robot arms 510 palletize items 106 onto the pallets 107. As mentioned before, progressively securing the various layers with the stretch wrapper 514 provides load stability and helps avoid items 106 from moving within or falling off the pallets 107. This in turn allows the three-dimensional robotic AS/RS carriage 108 to move faster. As can be seen, the stretch wrappers 514 are strategically placed so as to minimize interference with the robot arms 510. It should be recognized that other types of mechanism can be used to progressively secure the items 106, such as banding machines and adhesive guns, to name just a few. The AS/RS carriage 502 further includes turntables 516 on which the build pallets 107 are placed. The turntables 516 are used to rotate the pallets so as to facilitate stretch wrapping the film around the stacked items 106 on the pallet 107. The turntables 516 can also help position the pallets so as to help make it easier for the robot arms 510 to place items 106 onto the pallets, if required.

As can be seen in FIG. 7, the robot arms 510 include End-Of-Arm-Tools (EOAT) 702 which are, among other things, used to pick up the items 106 and place them on the pallets 107. The robot arms 510, as will be explained in greater detail below, can also be used to load empty pallets 107 onto the AS/RS carriage 502. Different end of arm tools 702 can be substituted depending on the needs of the particular operation.

Figure 9:
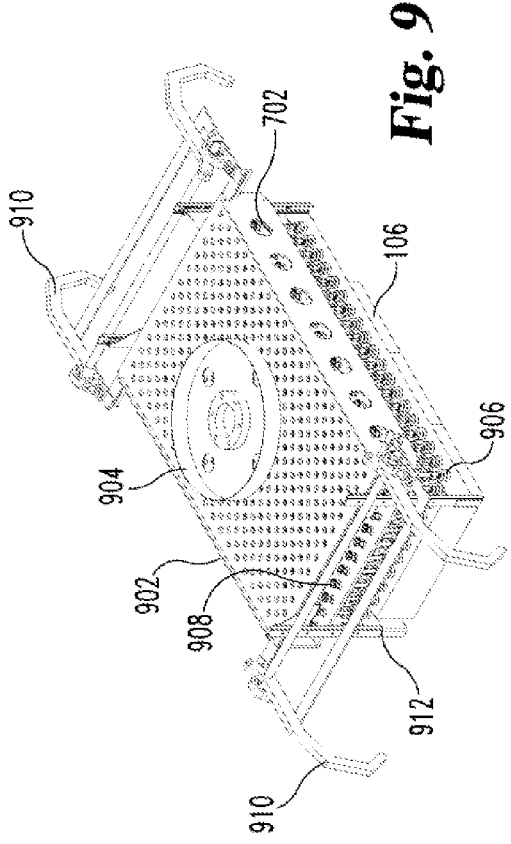
FIG. 9 is a perspective view of an end of arm tool used on the robotic arm for the three-dimensional robotic AS/RS shown in FIG. 1.
Figure 11:
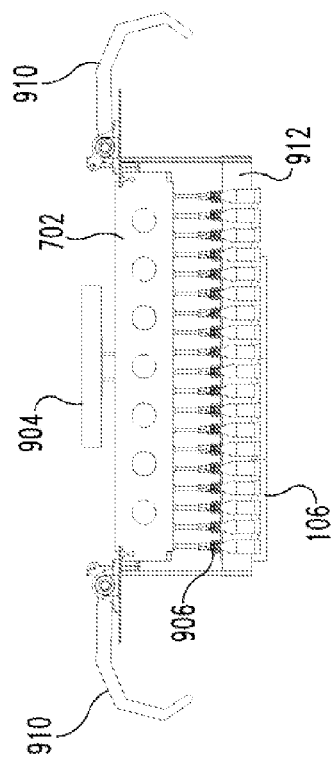
FIG. 11 is a side view of the FIG. 9 end of arm tool.
Figure 10:
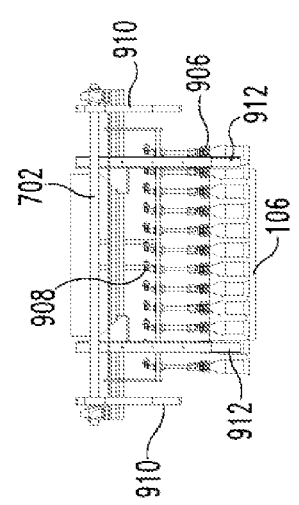
FIG. 10 is an end view of the FIG. 9 end of arm tool.

FIG. 9 illustrates a perspective view of the end of arm tool 702, and FIGS. 10 and 11 respectively show side views of the end of arm tool 702. Referring to FIG. 9, the end of arm tool 702 includes a support structure 902 which includes a connector 904 that is used to attach the end of arm tool 702 to the robot arm 510. The connector 904 allows the end of arm tool 702 to be automatically detached and reattached to the robot arm 510 in a fashion similar to a Computer Numerical Controlled (CNC) machine or vacuum cleaner attachment. To pick up the items 106 via a vacuum, the end of arm tool 702 includes a tight array of suction cups 906 that are secured to the support structure 902. The suction cups 906 have valves 908 that individually control the application of the vacuum to the various suction cups 906. This provides more granular control and therefore better adhesion of the suction cups 906 to the items 106. The shaft of the suction cups also move vertically to capture irregular shapes. The end of arm tool 702 further incorporates empty pallet hooks 910 that are pivotally coupled to the support structure 902. These pallet hooks 910 are actuated via any number of mechanisms, such as through hydraulic, pneumatic, electrical, and/or mechanical-type mechanisms, to name just a few examples. To center and hold the items in place, as can be seen in FIG. 10, the end of arm tool 702 includes paddles or clamps 912 that help center and stabilize the items when the vacuum is applied via the suction cups 906. This can be helpful when the robot arms 510 are moving rapidly along the gantry rail 512 as there is a tendency for the items 106 to slide along the suction cups 906 which in turn can cause a loss of vacuum. The clamps 912 which are slidably coupled to the support structure 902 help stabilize the items 106 so as to prevent the undesirable sliding. The side clamps may also have suction cups. The clamps 912 can be actuated in any type of mechanism, such as through hydraulic, pneumatic, electrical, and/or mechanical-type mechanisms, to name just a few examples.

The EOAT 702 incorporates a number of sensors for sensing items as well as locating EOAT. In one example, the EOAT 702 includes one or more laser depth sensors for sensing the relative location of the EOAT 702. The EOAT 702 in this example further includes a vision system that helps in palletizing the items. As mentioned before, the system can also incorporate a remote supervisor control which allows manual override of the system in a worst-case scenario. This allows the supervisor to operate the robotic AS/RS in a safe location such as on the ground. In certain examples, the robotic AS/RS can be ridden by an operator or picker if the robots are disabled. The Warehouse Management System (WMS) can incorporate a three-dimensional computer model of each build pallet, which is created prior to any picking or palletizing of various items. Each robotic AS/RS crane can have stop positions in which it is given a specific sequence of items/SKUs to pick for each of the four build pallets located on the crane. As noted before, more or less build pallets can be located on the crane in other variations.

Figure 12:
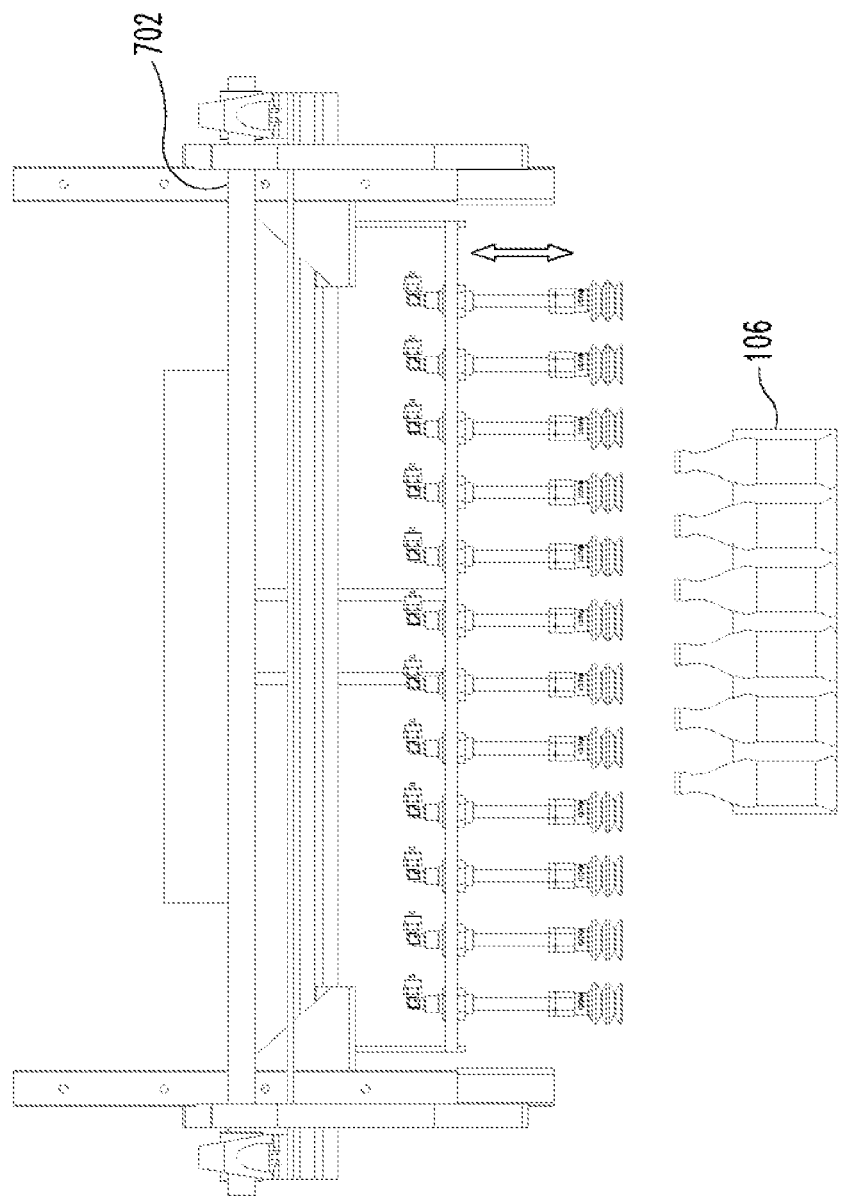
FIG. 12 is a side view of the end of arm tool before picking up an item.
Figure 13:
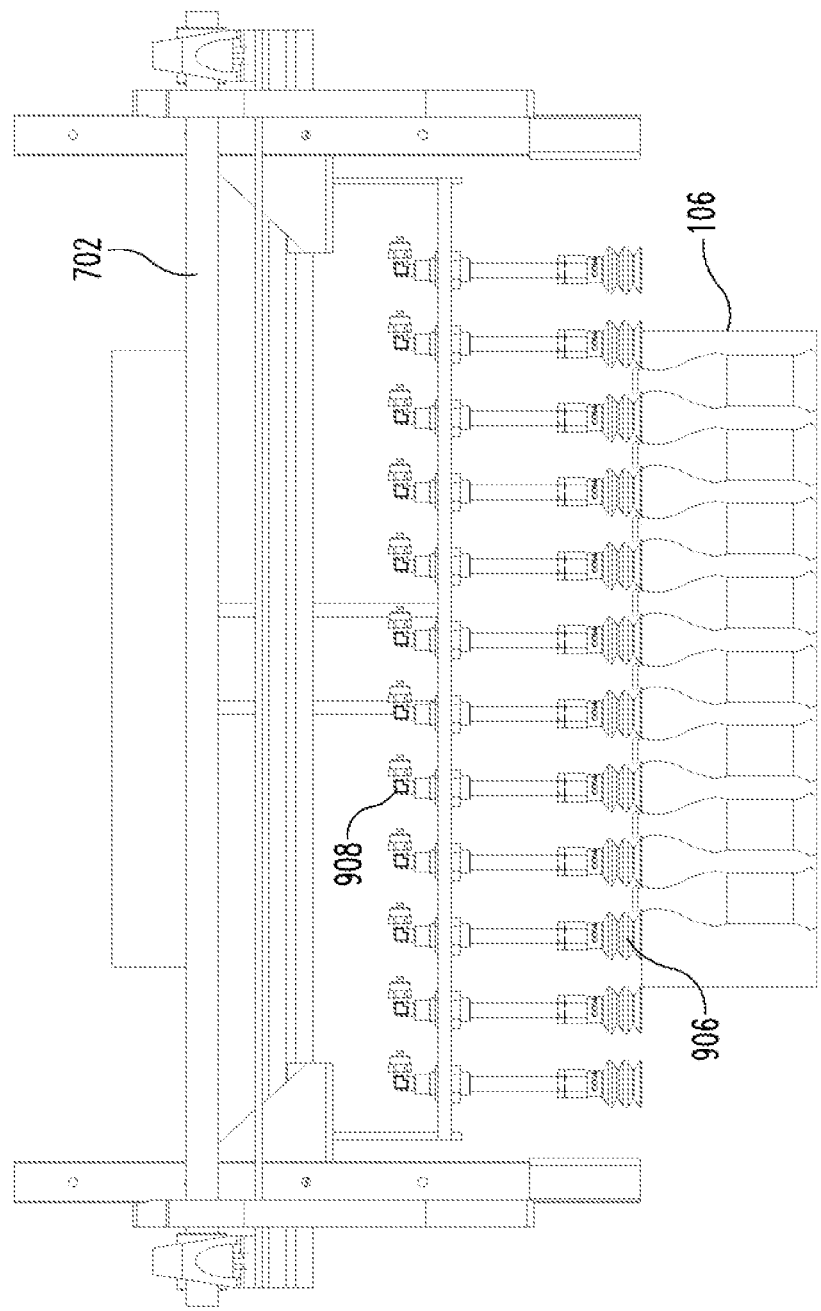
FIG. 13 illustrates a side view of the end of arm tool in which an item has been secured to the end of arm tool.
Figure 14:
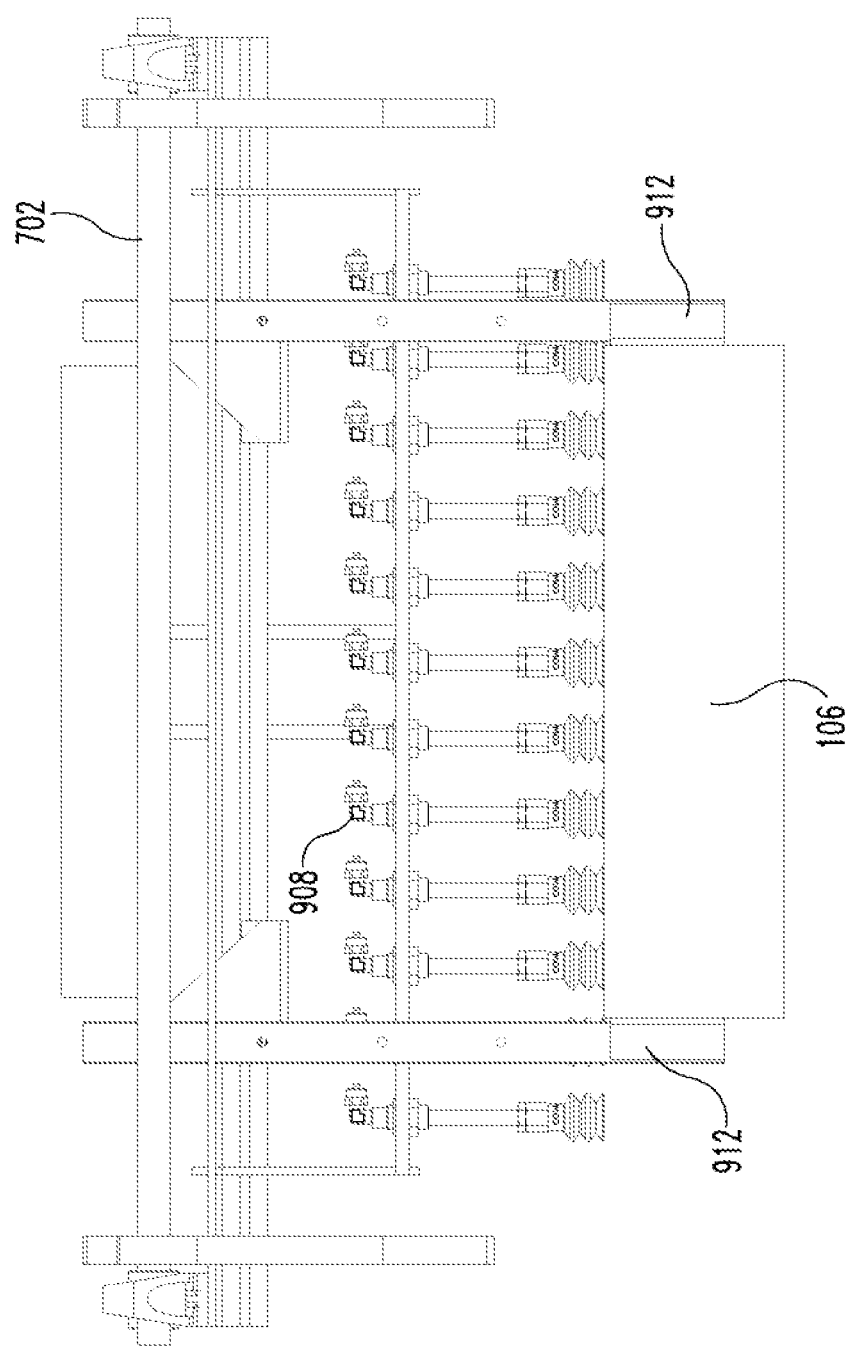
FIG. 14 is a side view of the end of arm tool in which the gripper members grip the side of the items.

FIGS. 12, 13, and 14 illustrate the progression of an item 106 being picked up by the end of arm tool 702. Initially, as depicted in FIG. 12, the item 106 is not secured to the end of arm tool 702. While the end of arm tool 702 is approaching the item 106, all of the hooks 910 and clamps 912 are retracted to allow the matrix of suction cups 916 to be displaced vertically by contacting the item 106. Once the robot arm 510 brings the end of arm tool 702 in close proximity to the item 106, the valves 908 on the end of arm tool 702 create a vacuum in the suction cups 906 that correspond specifically to the size of the item 106 to be picked, as is shown in FIG. 13. These suction cups 906 will contour to the shape of the item 106. By way of analogy, the individual suction cups 906 will be able to fit the topography of the item 106 in a fashion similar to the children's toy that has a matrix of pins that contours the object being placed against it, such as a hand, face, etc. As the suction cups 906 are displaced and create a tight seal, the vacuum will be turned off to non-gripping suction cups 912. The array of suction cups 906 that will be turned on will be controlled from an open loop warehouse management system that knows which item 106 is picked along with its specific xyz location and verified by a closed loop method, as through a laser sensor using "time of flight" with a vision system backup coupled with a control algorithm that send commands to the servo motors of the robot arm 510. The suction cup valves 908 close any suction cups 906 that are not holding vacuum. The suction cups 906 are designed to provide the necessary array density/resolution granularity to pick one or more items 106 off the top of the pick pallet 107. This density will be a function of individual weight of the item 106, achievable vacuum pressure, and the footprint of the item 106.

Once the vacuum is drawn, the side clamps 912 rotate inwardly against the item 106 so as to stabilize it and prevent any type of slippage. Both of the clamps 912 move inwardly, clearing the non-displaced suction cups 906 to clamp the item 106. By clamping the item 106 between the clamps 912, the shear stress on the suction cup 906 interface with the item 106 is minimized, which in turn facilitates high acceleration of the robotic arm 510 without the risk of items 106 falling off the end of arm tool 702. Once the end of arm tool 702 nears the build pallet 107, the clamps 912 retract in first the horizontal direction and then in the vertical direction to clear any items near the position where the picked item 106 is placed. The end of arm tool 702 can pick up multiple items 106 from a full layer at one time. The empty pallet hooks 910, which are used to pick empty pallets from the storage rack, stay retracted during a normal picking/putting operation.

The general operation of the mixed pallet build the system 100 will now be described with reference initially to FIG. 1. The empty pallet dispenser 116 dispenses pallets to the loading area 112. As depicted in FIG. 1, individual starter full layers of items 106 can be loaded onto the pallets 107. Alternatively or additionally, the empty pallets 107 can be loaded onto the AS/RS carriage 502. As mentioned before, the loading of individual layers onto the pallets 107 ahead of time provides higher case throughput and a more stable platform. The infeed conveyor feeds empty pallets 107 or partially filled starter pallets 107 onto the AS/RS carriage 502. Typically, the starter pallets 107 are centered onto the turntables 516. Once loaded with the pallets 107, the three-dimensional robotic AS/RS carriage 108 can initiate the build cycle of the mixed pallets.

Turning to FIG. 3, the three-dimensional robotic AS/RS carriage 108 moves horizontally within the rack aisle. The robot arms 510 pick the required items 106 from pallets 107 on the racks 102. The three-dimensional robotic AS/RS carriage 108 moves vertically to service the various rack levels 104. Once all of the items 106 are picked from the pick pallets at a particular section of the racks 102, the three-dimensional robotic AS/RS carriage 108 moves to the next section of rack bays 102. As mentioned before, the stretch wrappers 514 on the AS/RS carriage 502 progressively vertically wrap the various case layers of items 106 on the pallets 107. By progressively stretch wrapping the layers as they are built, the three-dimensional robotic AS/RS carriage 108 can accelerate and decelerate with lower risk of items 106 falling off of the carriage 502. The more unstable items are loaded near the top of the pallet 107. For the unstable items 106, the robot arm 510 can hold the items 106 in place as the stretch wrapper 514 wraps the items 106. The turntables 516 reorient the pallets 107 such that the robot arms 510 can easily access a particular location on the pallet 107 if required. The end of arm tool 702 can incorporate a laser depth sensor and a vision system so as to ensure that the items 106 are properly placed onto the build pallets 107 in accordance with the three-dimensional build software.

After all of the mixed pallets 110 are built, the three-dimensional robotic AS/RS carriage 108 returns to the unloading area 114, as is depicted in FIG. 2. Conveyors are used to discharge the finished pallet off of the AS/RS carriage. Forklifts, conveyors, and the like can be used to remove the mixed pallets 110 from the system discharge point 114. The turntables 516 on the three-dimensional robotic AS/RS carriage 108 include rollers, drag chain, locating grippers, or other conveying mechanisms to unload the built mixed pallets 110 onto a conveyor from which the forklift can be used to unload the mixed pallets 110 from the mixed pallet build system 100. The process can be reversed in order to replenish items 106 on the racks 102. One or more aisles of robotic AS/RS can be integrated for throughput systems.

Figure 15:
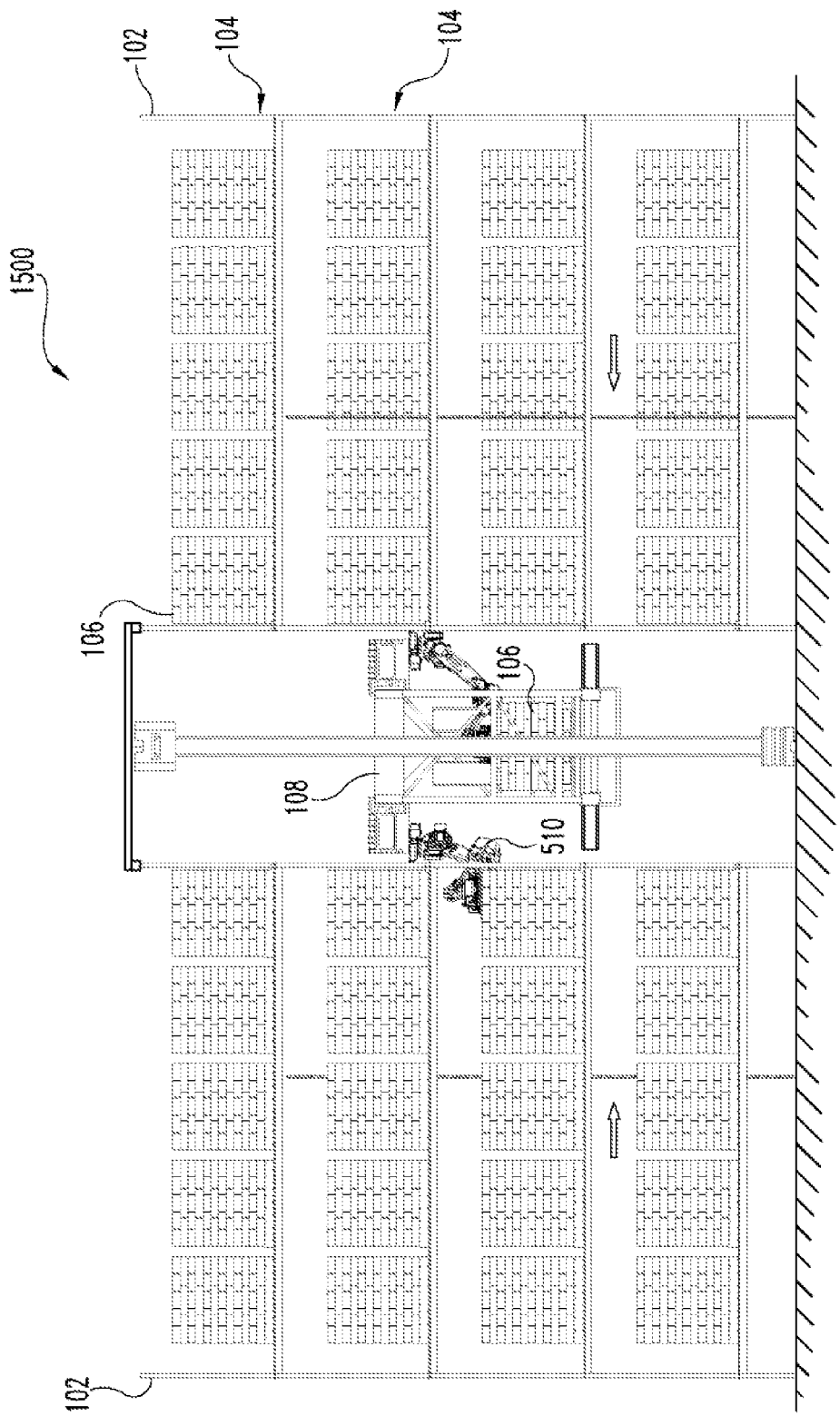
FIG. 15 is another example of a mixed pallet build system in which each rack contains multi-deep pallets of items.
Figure 16:
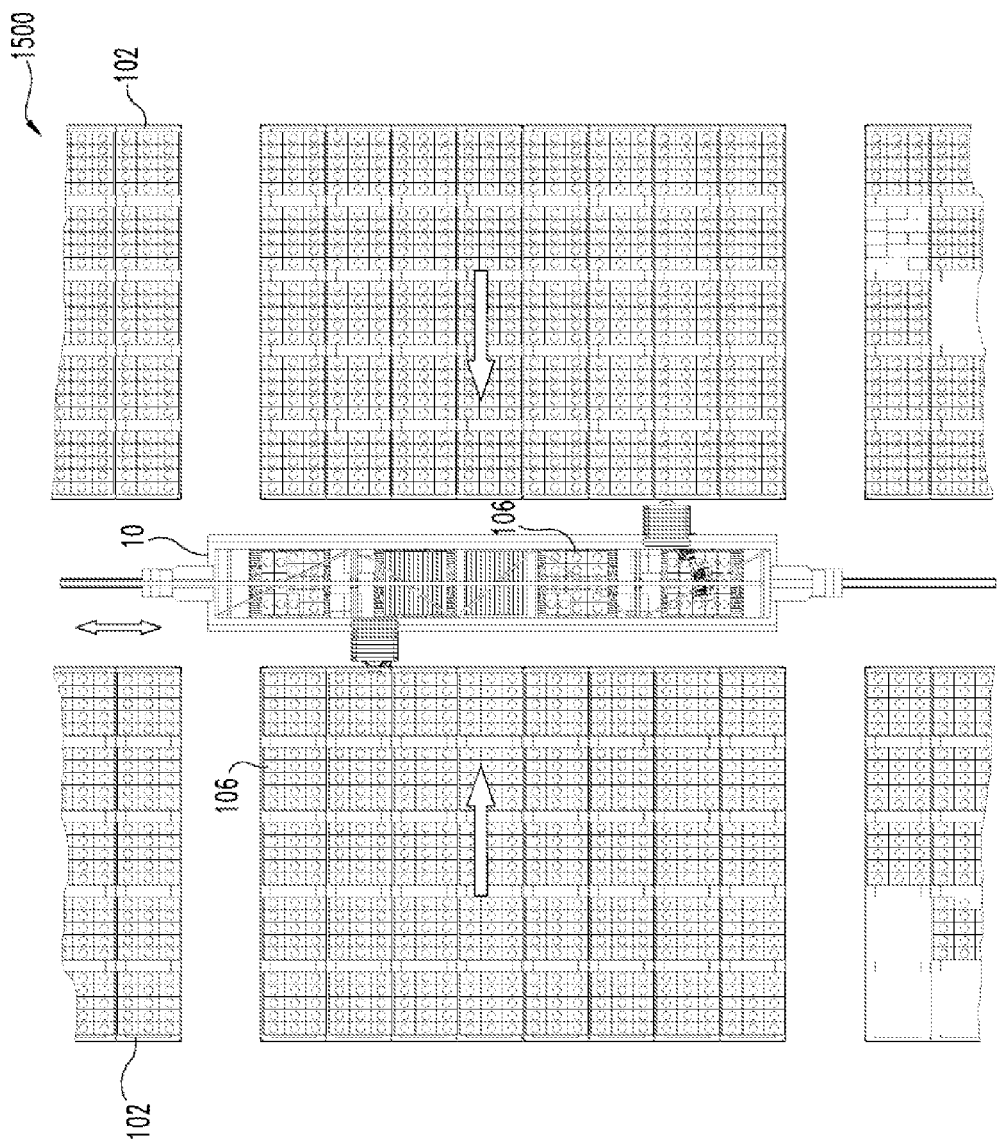
FIG. 16 is a top view of the FIG. 15 multi-deep mixed pallet build system.

FIGS. 15 and 16 respectively show end and top views of another example of a mixed pallet build system 1500. As will be recognized, the mixed pallet build system 1500 illustrated in FIGS. 15 and 16 shares a number of features in common with the one previously described above. For the sake of brevity as well as clarity, please refer to the descriptions of these common features as described herein. The main distinction between the mixed pallet build system 1500 illustrated in FIG. 15 as compared to the one illustrated in FIG. 1 is that the racks 102 include multi-deep pallets 107 of items 106 rather than just individual pallets. In other words, each vertical level 104 has multiple pallets 107 of items 106 on each level 104 rather than a single, deep row of pallets 107. Other than that, the mixed pallet build system 1500 operates in a similar fashion as described above.

Figure 17:
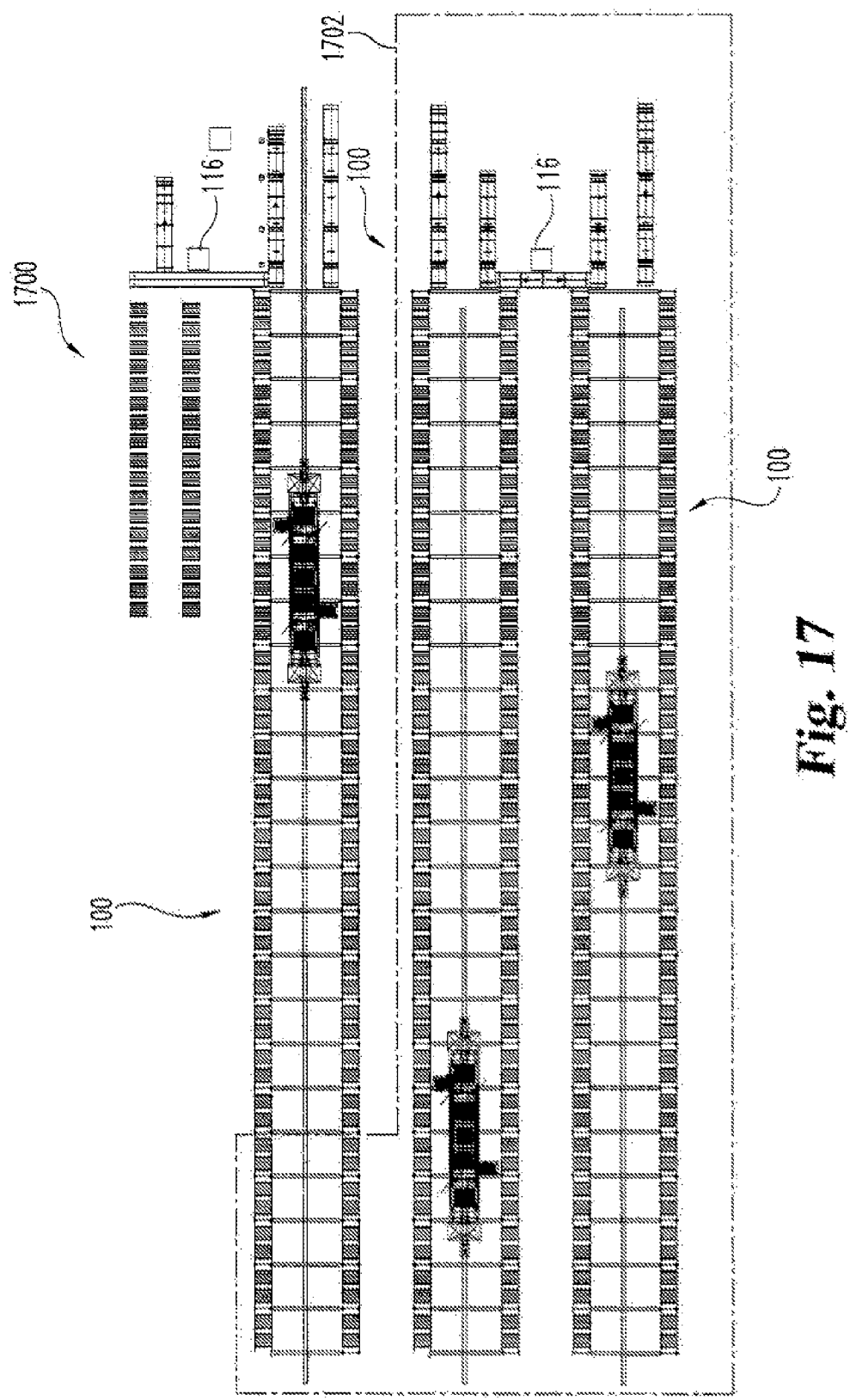
FIG. 17 is a top view of a system that includes multiple aisle pallet build systems.

FIG. 17 illustrates a three-dimensional robotic AS/RS mixed pallet build system 1700 according to still yet another embodiment. As will be appreciated, the system 1700 shares a number of features in common with those previously described above. For the sake of brevity as well as clarity, the common features shared between the systems will not be discussed in detail, but please refer to the previous discussion of these features. As can be seen, the system 1700 in FIG. 17 instead of just including a single mixed pallet build system aisle 100 includes an expansion area 1702 that contains additional mixed pallet build system aisles 100. Moreover, the expansion area 1702 further extends the racks 102 in the initial mixed pallet build system 100. In the expansion area 1702, the empty pallet dispenser 116 services multiple mixed pallet build system aisles 100. Other than the above-identified distinguishing features, the system 1700 in FIG. 17 operates in a fashion similar to that which was described above.

Figure 18:
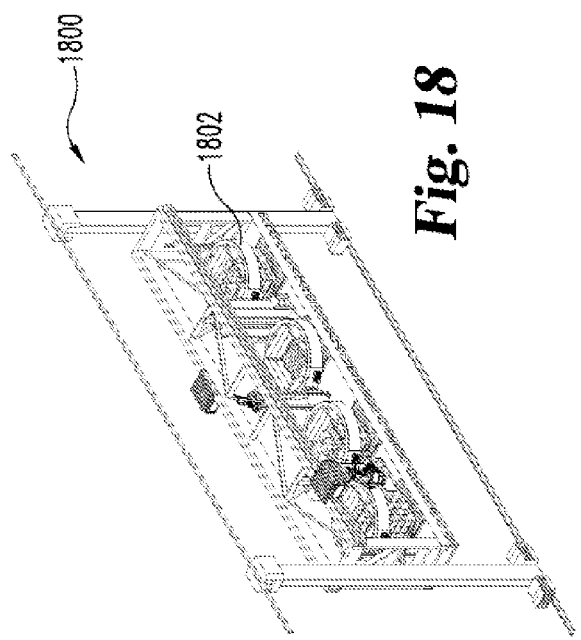
FIG. 18 is a perspective view of a three-dimensional robotic AS/RS for use in another type of mixed pallet build system with build pallet rings.
Figure 20:
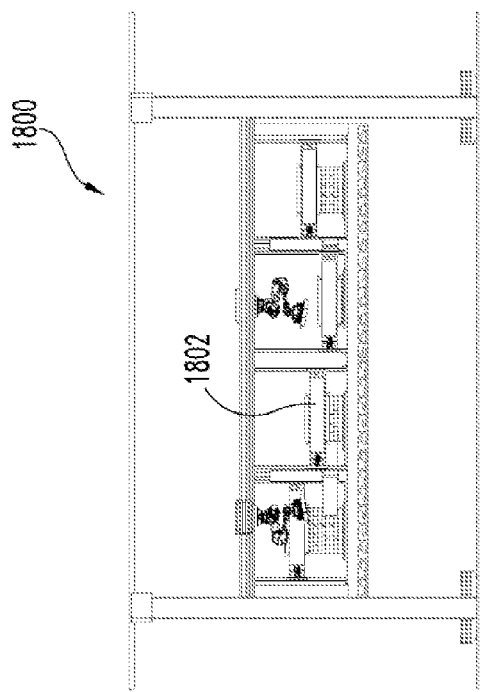
FIG. 20 is a side view of the robotic AS/RS shown in FIG. 18.
Figure 19:
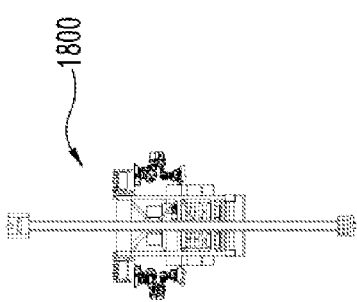
FIG. 19 is an end view of the robotic AS/RS shown in FIG. 18.

As mentioned before, one of the issues is due to the rapid movement of the robotic AS/RS, items have a tendency to fall off. There might be some instances where the stretch wrapper is unable to wrap an incomplete layer. FIGS. 18, 19, and 20 illustrate a three-dimensional robotic AS/RS 1800 that is configured to reduce the chances of items falling off of an incomplete SKU layer. As should be recognized, the robotic AS/RS 1800 in FIG. 18 incorporates all of the features of the one illustrated in FIG. 5, but in additional incorporates a build layer perimeter guide 1802 build layer perimeter guide 1802 for each pallet. For the sake of clarity as well as brevity, the common components of the three-dimensional robotic AS/RS will not be described again, but please refer to the previous discussion of these common features.

The build layer perimeter guide 1802 is designed to hold a partially picked top layer in place on the build pallet until stretch wrapping can occur. FIGS. 21, 22, and 23 illustrate an enlarged view of the build layer perimeter guide 1802. The ring 1802 includes an annular stator 2102 with an inner rotor 2104 that has a rectangular or square-shaped chute 2106. The chute 2106 can be shaped differently in other embodiments depending on the shape of the desired pallet. The build layer perimeter guide 1802 build layer perimeter guide 1802 further includes build pallet rails 2108 upon which the build layer perimeter guide 1802 build layer perimeter guide 1802 vertically moves. The build layer perimeter guide 1802 build layer perimeter guide 1802 moves vertically along the rails to follow the current build pallet pick level. This supports the items on the build pallet that have not yet been stretch wrapped or secured in some other manner. Looking at FIG. 22, the build layer perimeter guide 1802 build layer perimeter guide 1802 further incorporates a motor 2202 that is used to rotate the inner rotor as the pallet is rotated on the turntable billet. Supporting the unsecured layers with the build pallet ring enables greater acceleration of the AS/RS carriage as well as mitigates any problems with build pallets that warp by corkscrewing or leaning of the pallet. When the empty pallets or completed layers are inducted onto the carriage at the beginning of the system cycle, the build pallet ring moves via a linear actuator high enough to clear the pallet or build layers from the layer picking operation. The linear actuator in one embodiment can include a common, off the shelf screw/ball screw device but can include other types of actuators in other variations. The ring is then aligned with the inner rotor to allow the entire ring to come down on top of the pallet with a 1" to a 1.5" clearance on each side. This allows a ½" to 1" gap from the bottom of the ring to the top of the finished layer. The robot arm then picks to build the layer located inside the four walls of the chute 2106. After the layer has been built, the inner rotor 2104 and turntable will synchronously turn. During this operation, the entire ring will move vertically in synchronization with the stretch wrapper arm as the layer is stretch wrapped. After the entire build stack has been completed, the ring 1802 is moved vertically to clear the build stack, and the completed build stack is then conveyed off the layer at the appropriate time.

It is envisioned that the system can be configured differently in other embodiments. In the illustrated examples, the robot arms are in an inverted state, but in other variations, the robot arms can be located right-side up. Likewise, the EOAT can be configured differently in other embodiments. For instance, it was found that items that are significantly heavy, such as packages of bottles weighing 30 pounds or greater, the vacuum cups may not work as well when gripping from the top side due to the shrink wrap being ripped. With these heavier items, the packaging is designed such that the items need to be gripped from the bottom as opposed to from the top. In another variation, the EOAT can include vacuum cups that grip on the side to lift the shrink wrap SKUs and then load a thin conveyor underneath to provide adequate support.

In addition to the illustrated ring wrapper embodiments, it was found that for heavier items such as 30 pounds or greater, the ring wrapper is not necessary because the items will stay stationary. However, for lighter items, the ring wrapper may be needed to prevent items from falling off the stack as was mentioned before.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method comprising:
moving a three-dimensional robotic automated storage and retrieval system in a vertical direction to a first position;
loading items from a rack at the first position onto the three-dimensional robotic automated storage and retrieval system;
moving the three-dimensional robotic automated storage and retrieval system in a horizontal direction to a second position;
loading items from the rack at the second position onto the three-dimensional robotic automated storage and retrieval system;
wherein the three-dimensional robotic automated storage and retrieval system includes a carriage, a robot arm, a vertical lift mechanism, and a horizontal propulsion system, wherein the carriage has a length that is shorter than the length of the rack,
wherein said moving the three-dimensional robotic automated storage and retrieval system in the vertical direction includes moving the carriage vertically with the vertical lift mechanism;
wherein said loading items from the rack at the first position includes palletizing the items with the robot arm;
wherein said moving the three-dimensional robotic automated storage and retrieval system in the horizontal direction includes moving the carriage horizontally along a rack aisle with the horizontal propulsion system; and
wherein the carriage is secured at a horizontally fixed position relative to the vertical lift mechanism so that the carriage is unable to move horizontally relative to the vertical lift mechanism.

2. The method of claim 1, in which said loading items from the rack at the first position includes loading items with a robot arm secured to the three-dimensional robotic automated storage and retrieval system.

3. The method of claim 1, further comprising:
progressively securing vertical layers of the items on the three-dimensional robotic automated storage and retrieval system by stretch wrapping the layer as soon as a layer is complete with a stretch wrapper on the three-dimensional robotic automated storage and retrieval system.

4. The method of claim 3, further comprising:
holding an item in place with a robot arm on the three-dimensional robotic automated storage and retrieval system until the item is stretch wrapped.

5. The method of claim 1, further comprising:
securing the items progressively into palletized layers with a stretch wrapper.

6. The method of claim 5, further comprising:
rotating the palletized layers with a turntable.

7. The method of claim 1, further comprising:
rotating the items on three-dimensional robotic automated storage and retrieval system with a turntable.

8. The method of claim 1, further comprising:
wherein the vertical lift mechanism includes at least a pair of crane masts on which the vertical lift mechanism rides;
wherein the horizontal propulsion system includes at least a pair of vertically positioned rails, and
wherein said moving the three-dimensional robotic automated storage and retrieval system in the horizontal direction includes moving the crane masts horizontally along a rack aisle with active magnetic levitation bearings riding on one or more of the rails.

9. The method of claim 1, further comprising:
wherein the vertical lift mechanism includes at least a pair of crane masts on which the vertical lift mechanism rides;
wherein the horizontal propulsion system includes at least a pair of vertically positioned rails, and
wherein said moving the three-dimensional robotic automated storage and retrieval system in the horizontal direction includes moving the crane masts horizontally along a rack aisle with air bearings riding on one or more of the rails.

10. The method of claim 1, further comprising:
wherein the vertical lift mechanism includes at least a pair of crane masts;
wherein said moving the three-dimensional robotic automated storage and retrieval system in the vertical direction includes moving the carriage vertically with the vertical lift mechanism by powering linear servo motors disposed along the crane masts; and
wherein said loading items from the rack at the first position includes palletizing the items with the robot arm.

11. The method of claim 1, further comprising:
recovering energy during said moving the three-dimensional robotic automated storage and retrieval system in the vertical direction by regenerative braking.

12. The method of claim 1, further comprising:
wherein the three-dimensional robotic automated storage and retrieval system includes a robot arm with an end of arm tool that has a matrix of suction cups;
wherein said loading items from a rack at the first position includes picking the item with the end of arm tool; and
wherein said picking the item includes actuating individual suction cups of the end of arm tool by actuating individual valves associated with the suction cups.

* * * * *